(12) United States Patent
Scagliarini

(10) Patent No.: US 7,850,753 B2
(45) Date of Patent: *Dec. 14, 2010

(54) VENT FILTER WITH MEMBRANE

(75) Inventor: Marco Scagliarini, Bologna (IT)

(73) Assignee: GVS S.p.A., Zola Predosa (Bologna) (IT)

( * ) Notice: Subject to any disclaimer, the term of this patent is extended or adjusted under 35 U.S.C. 154(b) by 444 days.

This patent is subject to a terminal disclaimer.

(21) Appl. No.: 11/935,593

(22) Filed: Nov. 6, 2007

(65) Prior Publication Data

US 2008/0060327 A1  Mar. 13, 2008

Related U.S. Application Data

(63) Continuation-in-part of application No. PCT/IT2005/000265, filed on May 6, 2005, and a continuation-in-part of application No. 11/418,180, filed on May 5, 2006, now Pat. No. 7,572,309.

(60) Provisional application No. 60/678,184, filed on May 6, 2005.

(51) Int. Cl.
  *B01D 46/00* (2006.01)
(52) U.S. Cl. ........................ 55/385.4; 55/385.1; 55/320; 55/505; 55/510; 55/385.3; 95/273; 96/4; 362/547
(58) Field of Classification Search ................. 55/385.4, 55/385.1, 320, 505, 510, 385.3; 95/273; 96/4; 362/547
See application file for complete search history.

(56) References Cited

U.S. PATENT DOCUMENTS

| 4,900,441 | A | 2/1990 | Graus et al. |
| 5,406,467 | A | 4/1995 | Hashemi |
| 6,071,000 | A | 6/2000 | Rapp |
| 6,174,231 | B1 | 1/2001 | Bodin |
| 7,572,309 | B2 * | 8/2009 | Scagliarini ................. 55/385.4 |

FOREIGN PATENT DOCUMENTS

| DE | 197 02 685 | 7/1998 |
| EP | 0 717 231 | 6/1996 |
| EP | 0 860 923 | 8/1998 |
| EP | 1 184 602 | 3/2002 |
| JP | 07-147106 | 6/1995 |

* cited by examiner

*Primary Examiner*—Duane Smith
*Assistant Examiner*—Minh-Chau Pham
(74) *Attorney, Agent, or Firm*—Young & Thompson

(57) ABSTRACT

A filter (8) for venting an enclosure (1) containing an electrical apparatus (4), such as a lens or lighting unit of a motor vehicle, and exposed to moisture or atmospheric agents, includes a tubular body (20) with a through cavity or conduit (11) opening at opposite ends (9, 10) of the body (20), which is coupled to a venting aperture (6) of the enclosure (1), the filter (8) including a hydrophobic filtering element; the body (20) of this filter (8) has at least two portions (20A, 20B) set at an angle to each other, the membrane filtering element (15) being in the interior of the body (20) and associated therewith so as to form one piece therewith, and being coupled to the body (20) in a manner transverse to an axis of at least one of the portions. The membrane is located within the mould before injection molding.

17 Claims, 1 Drawing Sheet

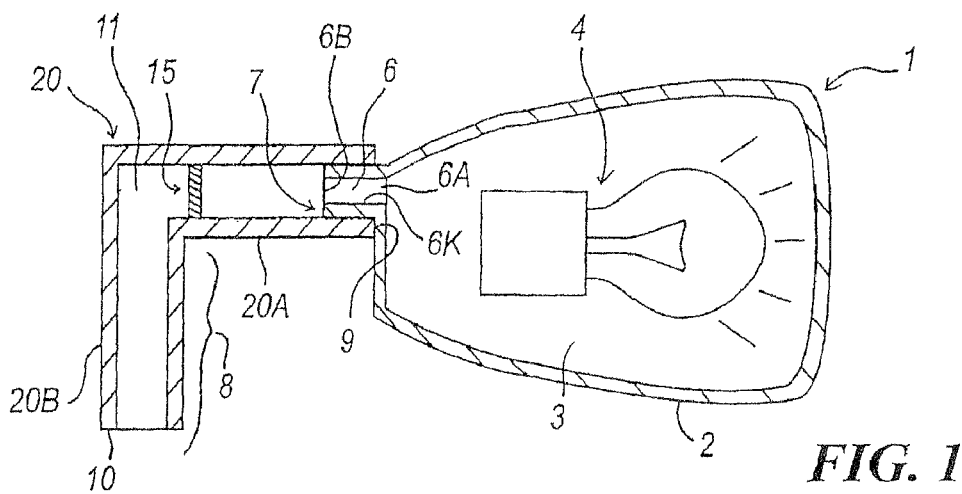
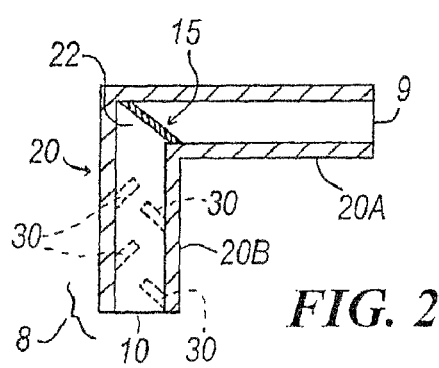
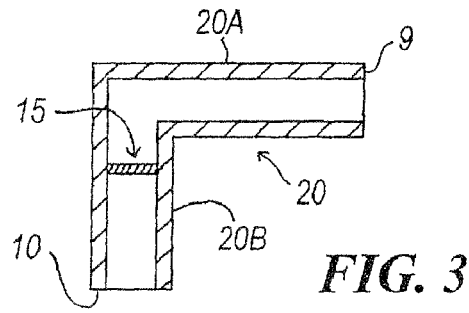
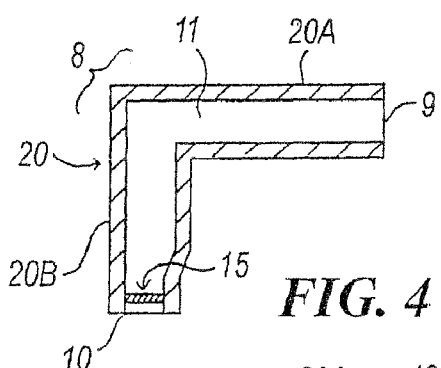
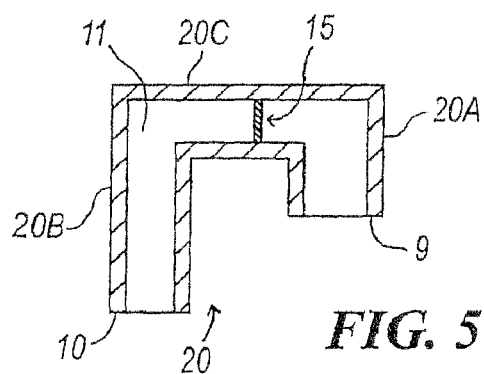
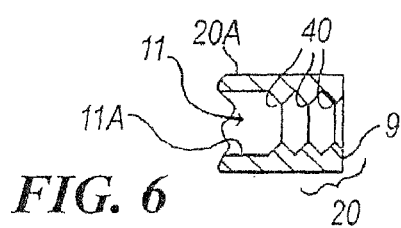
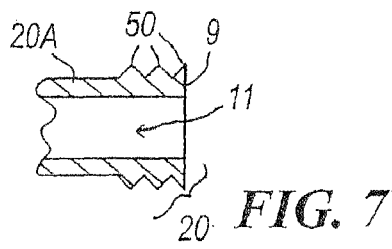

VENT FILTER WITH MEMBRANE

CROSS REFERENCE TO RELATED APPLICATIONS

This is a continuation-in-part of international application PCT/IT2005/000265 filed on May 6, 2005, which designated the United States of America; and a continuation-in-part of application Ser. No. 11/418,180 filed on May 5, 2006, now U.S. Pat. No. 7,572,309, which claimed the 35 USC 119(e) benefit of provisional application 60/678,184 filed on May 6, 2005. The entire content of all these applications is hereby incorporated by reference.

FIELD OF THE INVENTION

The present invention relates to a filter for venting an enclosure containing an electrical, mechanical, electromechanical or similar apparatus in accordance with the introduction to the main claim.

BACKGROUND OF THE INVENTION

It is known to use filters of the aforesaid type for venting or ventilating in the automobile industry (or in vehicles in general, this term meaning an automobile, a truck, a motorcycle or the like); these filters are associated for example with venting apertures of containers containing electrical or electronic parts (such as the lens or lighting or headlight units of motor vehicles) or mechanical parts (gear boxes, for example) where pressure has to be equalized between the interior of these containers and the external environment. These filters are also known to present a conformation or elements at least such as to limit water entry into said containers, said water being able to derive from rain or puddles or being able to derive from the washing of the vehicle or its engine. For example, a filter is known presenting a hollow tubular (elbow) bent conformation and shaped internally as a labyrinth to prevent or at least limit water access from the outside to the inside of the container via the tubular (venting) cavity of the filter.

Filters of the said type are also known using membranes of hydrophobic material associated with an internal conduit of the filter communicating with the container interior. Examples of these filters are those described in U.S. Pat. No. 5,914,415 and U.S. Pat. No. 5,522,769. In such filters of the state of the art and in particular in those described in the aforesaid US patents, the membrane is an element separate from the filter body and must be associated therewith by usually complex operations which require time and considerable care to prevent the membrane from breaking during handling. These operations are therefore costly.

For example, in U.S. Pat. No. 5,522,769 the hydrophobic membrane(preferably of polytetrafluoro ethylene) is inserted into a channel or seat lying transverse to a venting or passage conduit of the filter. The seat has a suitable diameter to securely contain the membrane. This known solution, in which the filter body has a substantially cap conformation and the venting conduit is rectilinear, is difficult to construct precisely because of the operations for coupling the membrane to the interior of the known filter body.

This latter also presents a rectilinear venting conduit which does not provide optimal protection to the container to which the filter is connected when this latter is subjected to a direct flow of liquid, such as to which that part of a front headlight of a vehicle facing the engine may be subjected when this latter is exposed to washing with relatively high water pressure.

This lack of protection against water infiltration can also appear in the case of tightness tests to which motor vehicle headlights or lens units or lighting systems are subjected, tests during which a high pressure water flow strikes the headlight container to verify its tightness. Again in this case, the conformation of the filter venting conduit is not such as to adequately protect the filtering membrane from the pressurized liquid should this latter cause breakage of the diaphragm provided in U.S. Pat. No. 5,522,769 for protecting the hydrophobic membrane. In this respect, the diaphragm can protect the membrane if the filter is immersed in a liquid or if the liquid is able to directly strike the membrane, as stated in the prior patent. However in this latter, the liquid which could strike the membrane is not stated to be a liquid under pressure, as is clear from the example offered in the text of the prior patent, in which this liquid is stated to be oil which is accidentally poured onto the filter.

U.S. Pat. No. 5,914,415 also describes a filter provided with a hydrophobic membrane or water repellent film associated, for example by subsequent fusion, with the filter body which is formed of elastomeric material. The, film is finally protected by a cover cap fixed by pins (rigid with the cap) inserted into seats in the elastomeric body. The filter described in the prior patent is constructed as a plurality of parts assembled together, resulting in high costs and production times, together with constructional difficulties related to the operations of coupling the water repellent membrane or film to the elastomeric body and of coupling the cap to this latter body.

SUMMARY OF THE INVENTION

An object of the present invention is to provide a filter for venting an enclosure, for example containing electrical apparatus such as an enclosure used in the automobile field as a lens unit (or lighting system in general) or container for electrical circuitry for controlling a vehicle engine, which is improved compared with already known similar filters.

A particular object of the invention is to provide a filter of the stated type which can be produced 20 relatively quickly at low cost.

Another object is-to provide a filter of the stated type which offers a mechanical strength and a liquid seal which are optimal under all conditions of utilization of the container with which the filter is associated and in all other situations in which this container is struck by a liquid under pressure. These and further objects which will be apparent to the expert of the art are attained by a filter in accordance with the accompanying claims.

BRIEF DESCRIPTION OF THE DRAWINGS

The present invention will be more apparent from the accompanying drawings, which are provided by way of non-limiting example and in which:

FIG. 1 is a schematic cross-section through a first embodiment of a filter of the invention applied to an enclosure defined by a vehicle lens unit, also shown 10 schematically; and FIGS. from 2 to 7 are cross-sections through further embodiments of the invention.

DETAILED DESCRIPTION OF THE INVENTION

With reference to said figures, an enclosure to be vented is indicated overall by 1. In the example it is schematically shown as a lens unit or headlight or lighting system of a motor vehicle, but can be any container of an electrical or mechanical apparatus of a vehicle. The enclosure 1 comprises a body 2, internally hollow at 3, where an electrical apparatus 4 (a light bulb in the example) is located. The cavity 3 communicates with the outside of the body 2 via a conduit 6 provided in an appendix 7 projecting from this body, said conduit 6 being open at both its ends 6A (communicating with the cavity 3) and 6B (communicating with the outside of the enclosure).

In correspondence with the end 6B of the appendix 7 there is connected a filter 8 formed in accordance with the invention. It is such as to enable said cavity 3 to be vented, but to prevent water entry and to reduce the entry of moisture into it.

More particularly, the filter 8 presents a body 20 having at least two internally hollow tubular rectilinear portions 20A, 20B. These are disposed at an angle to each other and between them there is an angled region 22 forming a discontinuity of the conduit 11. Said region can be an angled region or a curved region and connecting the angled portions 20A, 20B of the body 20.

The two rectilinear portions 20A, 20B can be made of different materials, having different hardnesses; for example, the first portion 20A is made of a rigid material while the second portion 20B is made of a soft and at least partly elastic material. The latter is for example chosen among PVC, TPE or a silicon material. Should this material be used for obtaining the first rectilinear portion 20A, the latter can be easily drawn on the appendix 7. Thanks to the used material, the connection of the latter allows a sealed connection between the filter and the enclosure 1 to be obtained.

A first portion 20A is connected, via its free end 9, directly to the appendix 7 of the body 2 of the enclosure 1, whereas the second portion 20B presents a free end 10 at which there opens an internal conduit 11 of the filter 8. This internal conduit 11 communicates with that 6 of the appendix 7, enabling air to pass from the outside to the inside of said body 2 and vice versa. In this manner the internal cavity 3 of the enclosure 1 can be correctly aerated. The angled arrangement of the at least two portions 20A, 20B of the filter 8 also prevents any water droplets present outside the filter from being able to easily pass to the interior of the enclosure 1. Said conformation also prevents any water jets used to wash the automobile or its engine from penetrating into the enclosure 1 when the lens or lighting unit is sufficiently protected by the bodywork of such a vehicle (automobile, motorcycle, heavy vehicle or truck, or the like).

To ensure that this water passage does not take place, a filtering element of hydrophobic membrane type 15 (of known type) is positioned in the internal conduit 11 of the filter 8, in any position between its ends 9, 10, transversely to the conduit 11, to prevent passage of water from the end 10 to the end 9 (and from there into the enclosure 1). According to an important characteristic of the invention, the filtering element or, more simply, the membrane 15 forms one piece with the body 20 of the filter 8. Preferably, the membrane is incorporated, in correspondence with its edge, into said body (constructed of plastic material). The membrane 15 hence forms one piece with said body 20, so as to be stably associated with it.

To obtain said integration between the body 20 and the membrane 15, the filter 8 is preferably constructed in accordance with the teachings of EP1184602. According to this latter, the filter 8 is obtained by moulding with a mould shaped to enable the free edge of the membrane 15 to be incorporated into the plastic material in the molten state which is injected into the mould, said material wrapping said edge of the membrane and incorporating it into itself when the material cools. The mould obviously has a shape such as to enable the body 20 to be obtained with at least two portions at an angle to each other.

As stated, the membrane 15 can be disposed in any position in the interior of the conduit 11 within its rectilinear portion or in correspondence with a discontinuity thereof. Different examples of this positioning are shown in particular in FIGS. from 2 to 4; specifically, in FIG. 2 the membrane 15 is positioned in correspondence with the angled region 22 of the conduit 11, the region in which the two portions 20A and 20B of the filter body 20 join together. This solution enables a hydrophobic membrane or filtering element 15 to be obtained having effective dimensions greater than the transverse dimensions of the conduit 11, so enabling a greater surface for gas transfer between the inside and outside of the enclosure 1 to be obtained.

In FIG. 3 the membrane 15 is positioned in correspondence with the portion 20B of the body 20 of the filter 8, in contrast to that of the filter of FIG. 1 where the membrane 15 is positioned in correspondence with the portion 20A of that body.

In FIG. 4, however, the membrane 15 is close to one of the ends (in the example the end 10) of the body 20 of the filter 8, while again remaining inside the conduit 11.

With regard to the portions 20A, 20B of the body 20 of the filter 8, these can present a corresponding conduit 11 with constant cross-section (FIGS. 1 and 3) or variable cross-section (FIG. 4). In this latter case, varying the cross-section of the conduit also varies the flow rate of fluid or gas from one end of the conduit 11 of the filter 8 to the other.

Moreover, advantageously, one or more of the portions 20A, 20B of the body 20 can present a labyrinth conformation within the corresponding part of the conduit 11 so as to improve the liquid seal of the filter. In that case, the labyrinth is defined by a series of fins 30 (shown dashed in FIG. 2) projecting towards the centre, of the conduit and disposed between the end 10 and the membrane 15.

Moreover, to increase the capacity to prevent possible liquid passage from the end 10 to the end 9 of the body 20 of the filter 8, this latter can also have more than two angled portions between the portions 20A and 20B; FIG. 5 shows an embodiment in which the portions are of odd number (for example three), between the portions 20A and 20B there also being present a third portion 20C.

The filter 8 can be coupled to the appendix 7 in any known manner, for example by drawing its first portion 20A over said appendix (as shown in FIG. 1). To achieve a better liquid seal, the free end 9 of said portion 20A can present a plurality of circular projections 40 in the interior of the conduit 11 (i.e. jutting from its wall 11A) arranged to cooperate with the free surface of the appendix 7.

Alternatively, if the portion 20A is coupled to the appendix 7 by being inserted into the conduit 6, the projections 50 can be provided on the outside of the 5 portion 20 to cooperate with the wall 6 K of said conduit 6 in order to seal against it.

Embodiments of the invention have been described. Others are however obtainable, such as that in which the body 20 assumes a disjointed conformation and comprises more than one membrane 15, or that in which the membrane 15 is co-moulded with the body 20 of the filter 8. These solutions are also to be considered as falling within the scope of the following claims.

The invention claimed is:

1. A filter for venting an enclosure containing an electrical apparatus of a motor vehicle, or a mechanical or electromechanical member of a vehicle, said enclosure being exposed to moisture or atmospheric agents, said filter comprising:

a tubular body with a through cavity or conduit opening at opposite ends of said tubular body, said conduit being coupled to a venting conduit of said enclosure; and a filtering element in the form of a hydrophobic membrane, said tubular body comprises at least two rectilinear portions set at an angle to each other, the filtering element being in an interior of the conduit provided within said tubular body and being associated with said conduit in such as manner as to form one piece therewith, the filtering element being disposed transversely within the conduit, the filtering element being incorporated into the body of the filter as an integral combination between said tubular body and said filter, the filter so obtained enabling said enclosure to be vented, but to prevent water entry and to reduce the entry of moisture into said enclosure.

2. The filter as claimed in claim 1, wherein the filtering element is positioned in correspondence with a region of the filter located between the at least two rectilinear portions, said region forming a discontinuity of said conduit.

3. The filter as claimed in claim 2, wherein said region is an angled region of said conduit, said region being present in a connection zone between two adjacent rectilinear portions of the tubular body of the filter, the filtering element being located in correspondence of said angled region.

4. The filter as claimed in claim 2, wherein said region is a curved region of the conduit, and connecting the rectilinear portions of the tubular body of the filter, the filtering element being located within the curved region.

5. The filter as claimed in claim 3, wherein the filtering element has a surface area greater than a cross-sectional area of each rectilinear portion of the conduit.

6. The filter as claimed in claim 1, wherein the filtering element is co-moulded with the tubular body of the filter.

7. The filter as claimed in claim 1, further comprising within said conduit a plurality of projections jutting from a wall of said conduit towards an interior thereof, said projections defining a labyrinth in the interior of said conduit and being present between a free end of the tubular body and the filtering element, the projections improving a blocking action against water which may have entered the conduit from the free end.

8. The filter as claimed in claim 1, wherein the conduit is of variable cross-section.

9. The filter as claimed in claim 1, wherein the tubular body is coupled to an appendix of said enclosure in which the venting conduit is provided.

10. The filter as claimed in claim 9, wherein the tubular body presents one of said rectilinear portions drawn over said appendix which is hence inserted into the conduit of said body, projections jutting from a wall of said conduit cooperate with said appendix in order to seal against the appendix when coupling is complete.

11. The filter as claimed in claim 9, wherein the tubular body presents one of said rectilinear portions inserted into the venting conduit of said appendix, which is hence external to said rectilinear portion, on an outside of said rectilinear portion there being provided projections arranged to cooperate a wall of said venting conduit in order to seal against the wall when coupling is complete.

12. The filter as claimed in claim 1, wherein the two rectilinear portions of the tubular body are made of different materials having different hardnesses.

13. The filter as claimed in claim 11, wherein one of said two rectilinear portions is made of a rigid material, the other one of said rectilinear portions being made of a soft, at least partly elastic material.

14. The filter as claimed in claim 12, wherein one of the rectilinear portions is drawn over an appendix of the enclosure and is made of a material softer than that of the other rectilinear portion.

15. The filter as claimed in claim 13, wherein the soft and elastic material is chosen among PVC, TPE or silicon rubber, said material allowing a sealed connection between the filter and the enclosure to be obtained.

16. The filter as claimed in claim 4, wherein the filtering element has a surface area greater than a cross-sectional area of each of the rectilinear portions of the conduit.

17. The filter as claimed in claim 9, wherein one of the rectilinear portions is drawn over the appendix and is made of a material softer than that of the other rectilinear portion.

* * * * *